US008015383B2

(12) United States Patent
Shultz et al.

(10) Patent No.: US 8,015,383 B2
(45) Date of Patent: Sep. 6, 2011

(54) SYSTEM, METHOD AND PROGRAM TO MANAGE VIRTUAL MEMORY ALLOCATED BY A VIRTUAL MACHINE CONTROL PROGRAM

(75) Inventors: Steven Shultz, Endicott, NY (US); Xenia Tkatschow, Jamesville, NY (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 11/769,161

(22) Filed: Jun. 27, 2007

(65) Prior Publication Data

US 2009/0006801 A1 Jan. 1, 2009

(51) Int. Cl.
*G06F 12/00* (2006.01)
(52) U.S. Cl. ............ 711/170; 711/6; 711/134; 711/153; 711/165
(58) Field of Classification Search .................. 711/154, 711/170, 203, 6, 134, 153, 165
See application file for complete search history.

(56) References Cited

U.S. PATENT DOCUMENTS

| 5,684,974 | A * | 11/1997 | Onodera ................... 711/202 |
| 6,542,926 | B2 * | 4/2003 | Zalewski et al. .............. 709/213 |
| 7,500,048 | B1 * | 3/2009 | Venkitachalam et al. ........ 711/6 |
| 2002/0016891 | A1 * | 2/2002 | Noel et al. .................... 711/153 |
| 2003/0088752 | A1 | 5/2003 | Harman |
| 2005/0232192 | A1 | 10/2005 | Rawson, III |
| 2005/0235123 | A1 | 10/2005 | Zimmer et al. |
| 2006/0123416 | A1 * | 6/2006 | Cibrario Bertolotti et al. ... 718/1 |
| 2009/0113161 | A1 * | 4/2009 | Bitner et al. .................. 711/170 |

OTHER PUBLICATIONS http://www.elink.ibmlink.ibm.com/publications/servlet/pbi. wss?SSN=07FZO0035982015297&FNC=SRH, "z/VM Version 5 Release 1.0 General Information" (Document Number: GC24-6095-00).
http://www.elink.ibmlink.ibm.com/publications/servlet/pbi. wss?SSN=07FZO0035982015297&FNC=SRH, z/VM Version 5 Release 1 Updated Edition (Document No. GC24-6095-01).
Chartock, H. et al., "Virtual Swap Spce in SunOS", EurOpen. UNIX Goes East. Proceedings of the Autumn 1991 EurOpen Conference, 1992, Budapest, Hungary: 9 pages.

* cited by examiner

*Primary Examiner* — Reba I Elmore
(74) *Attorney, Agent, or Firm* — Dennis Jung

(57) ABSTRACT

Management of virtual memory allocated by a virtual machine control program to a plurality of virtual machines. Each of the virtual machines has an allocation of virtual private memory divided into working memory, cache memory and swap memory. The virtual machine control program determines that it needs additional virtual memory allocation, and in response, makes respective requests to the virtual machines to convert some of their respective working memory and/or cache memory to swap memory. At another time, the virtual machine control program determines that it needs less virtual memory allocation, and in response, makes respective requests to the virtual machines to convert some of their respective swap memory to working memory and/or cache memory.

14 Claims, 3 Drawing Sheets

SYSTEM, METHOD AND PROGRAM TO MANAGE VIRTUAL MEMORY ALLOCATED BY A VIRTUAL MACHINE CONTROL PROGRAM

FIELD OF THE INVENTION

The invention relates generally to computer systems, and deals more particularly with managing memory of a virtual machine.

BACKGROUND OF THE INVENTION

Computers, configured as virtual machines, are well known today. In this configuration, a hypervisor program logically divides physical resources (including CPU, memory, storage and I/O devices) of a real computer into separate virtual machines. For example, the hypervisor allocates to each virtual machine a time share of one or more real processors and a range of virtual private memory mapped to real RAM. When a virtual machine addresses its own virtual private memory, the hypervisor translates the virtual private memory address into a real address of real memory. The hypervisor also allocates virtual private memory to itself to store the hypervisor program, including its control structures, and data used by the hypervisor program. In a known IBM z/VM operating system, the hypervisor program is called a Control Program ("CP"), and each virtual machine may also be called a "user portion" or "guest".

It was also known for a logical partitioning program to logically divide the physical resources of a real computer (including CPU, memory, storage and I/O devices) into logical partitions ("LPARs"), and then for a hypervisor program to execute in each LPAR and divide the resources of each LPAR into virtual machines. In a known IBM zSeries computer, a known IBM Processor Resource/Resource Manager ("PR/SM") program divides or partitions a real computer into LPARs. Typically, an administrator assists in defining each LPAR by specifying to the logical partitioning program the amount of CPU, memory and storage for each LPAR. The logical partitioning program can allocate to each LPAR specific real computer resources or a logical share of the total computer resources. The virtual machines in each LPAR operate in the same manner as if they were formed directly from the real computer without any logical partitioning.

A previously known IBM z/VM version 5.1 virtual machine operating system includes a known hypervisor program which forms virtual machines from LPARs or from an undivided real computer. The details of the existing z/VM 5.1 operating system are disclosed in IBM publications "z/VM Version 5 Release 1.0 General Information" (Document Number: GC24-6095-00) with "z/VM Version 5 Release 1 Updated Edition" (Document number GC24-6095-01) which are available from International Business Machines Corp. at PO Box 29570, IBM Publications, Raleigh, N.C. 27626-0570 or on the WWW at the IBM home page with suffix "/shop/publications/order". These publications are hereby incorporated by reference as part of the present disclosure.

A guest operating system executes in each virtual machine (using the virtual machine's share of CPU, memory, etc.). One or more applications and middleware programs (such as a file manager) execute on each guest operating system. Even though each application, middleware program and guest operating system are executing in a virtual machine, they operate as if they are executing in their own private, real computer. The guest operating system in each virtual machine can be the Linux (™ of Linus Torvalds) operating system, IBM CMS operating system or other operating system. The application and middleware that execute on each guest operating system on each virtual machine can be an IBM DB2 data base management application, IBM Websphere application, or various other programs.

The guest operating system, middleware, application(s) and data for each virtual machine are stored in a working memory portion of the virtual private memory allocated to the virtual machine. Each virtual machine also includes a cache memory portion of the virtual private memory allocated to the virtual machine. The cache memory contains data accessed from (disk) storage and associated metadata. The metadata comprises a directory and sub directory path to the data file, identities of records within the file currently being written or read, size of the file, size of records in the file, type (ASCII, EBCDIC or BINARY) of data in the file, where the file is stored on disk, etc. Most guest operating systems include some algorithm for determining which pages of data should will remain in the cache memory when the cache is full and which pages of data should remain in the working memory when the working memory is full. For example, most guest operating systems use a least recently used algorithm to outpage the least recently used data from the cache memory to external storage when there is insufficient room in the cache memory for new data needed by the virtual machine, and use a similar algorithm to outpage the least recently used data from the working memory to external storage when there is insufficient room in the working memory for new data needed by the virtual machine.

A virtual machine may also include a swap memory portion of the virtual private memory allocated to the virtual machine from RAM. A swap memory of a virtual machine is used as a memory location to receive and store data paged out from cache memory and working memory instead of paging out the data to disk storage. In a typical scenario, when there is insufficient cache memory or working memory to store data (information or programs) needed by the virtual machine, the guest operating system in the virtual machine identifies the least recently used memory data (as four Kilobyte pages) in cache memory or working memory of the virtual machine. Then, the guest operating system can copy the least recently used memory pages to swap memory or disk storage in the virtual machine. The guest operating system determines whether to page-out to swap memory or (disk) storage based an administrator-defined configuration of the virtual machine. The administrator can configure the virtual machine to page-out to one or other or to page-out to swap memory until full and then page-out to disk. Paging out frees up cache memory and working memory to enable the guest operating system to inpage other, more needed pages of data from swap memory or storage to cache memory or working memory.

The Linux operating system (and other operating systems), as a guest operating system, virtualizes the virtual private memory that the hypervisor allocates to it. In its own virtualization process, the Linux operating system over-commits the virtual private memory that the hypervisor has allocated to it. For example, assume that the hypervisor allocated three Gigabytes of virtual private memory to the virtual machine having the Linux (or other) guest operating system. In response, the Linux guest operating system may itself virtually allocate six Gigabytes to processes executing on the Linux operating system. This is realistic because the processes typically use, on average, much less memory than allocated to them. Nevertheless, the Linux operating system (and Microsoft Windows operating system) tends to keep stale data in its working memory and cache memory, because there is some chance that it will be needed in the future and this will reduce outpaging and inpaging. Because of this, typically, the Linux operating system either fails to utilize swap memory or substantially under utilizes its swap memory during normal operation, even when the Linux operating system is configured to use swap memory for page outs.

The hypervisor tracks how much memory (called the "working set") that each virtual machine has used during a prior interval. The hypervisor uses the combined size of the "working sets" of all the virtual machines to determine how much memory is available for itself and other virtual machines that it may subsequently create. The hypervisor over-commits, to itself and the other virtual machines that it may subsequently create, the available virtual private memory because the hypervisor and all virtual machines typically do not use all of their respective memory allocations.

Occasionally, the hypervisor needs additional memory for its own operation, to form another virtual machine, or to allocate to an existing, critical virtual machine which is short of memory. In any such case, the hypervisor (such as found in IBM z/VM 5.1 operating system) can make requests to the virtual machines with excess virtual private memory to voluntarily relinquish some of their existing allocation of virtual private memory. Typically, in response to the request, the virtual machines will relinquish some of their total virtual private memory allocation, and then rebalance their amounts of working memory and cache memory based on their remaining allocation of virtual private memory. Some guest operating systems will relinquish virtual private memory solely from their cache memory if available. The swap memory allocation, if any exists, is unaffected. However, this may leave some or all of the virtual machines with insufficient amounts of virtual private memory to effectively perform their work items.

An object of the present invention is to better manage allocation of memory.

Another object of the present invention is to better manage allocation of memory to virtual machines.

SUMMARY OF THE INVENTION

The invention resides in a system, computer program product and method for managing virtual memory allocated by a virtual machine control program to a plurality of virtual machines. Each of the virtual machines has an allocation of virtual private memory divided into working memory, cache memory and swap memory. The virtual machine control program determines that it needs additional virtual memory allocation, and in response, the virtual machine control program makes respective requests to the virtual machines to convert some of their respective working memory and/or cache memory to swap memory.

According to features of the present invention, each of the requests specifies an amount of working memory and/or cache memory to convert to swap memory. The plurality of virtual machines include a respective plurality of guest operating systems that are programmed to utilize working memory and/or cache memory allocated to their respective virtual machine more fully than swap memory allocated to the respective virtual machine.

The invention also resides in a system, computer program product and method for managing virtual memory allocated by a virtual machine control program to a plurality of virtual machines. Each of the virtual machines has an allocation of virtual private memory divided into working memory, cache memory and swap memory. The virtual machine control program determines that it needs less virtual memory allocation than currently allocated to the virtual machine control program, and in response, the virtual machine control program makes respective requests to the virtual machines to convert some of their respective swap memory to working memory and/or cache memory.

According to features of the present invention, each of the requests specifies an amount of swap memory to convert to working memory and/or cache memory. The plurality of virtual machines include a respective plurality of guest operating systems that are programmed to utilize working memory and/or cache memory allocated to their respective virtual machine more fully than swap memory allocated to the respective virtual machine.

DETAILED DESCRIPTION OF THE PREFERRED EMBODIMENTS

Figure 1:
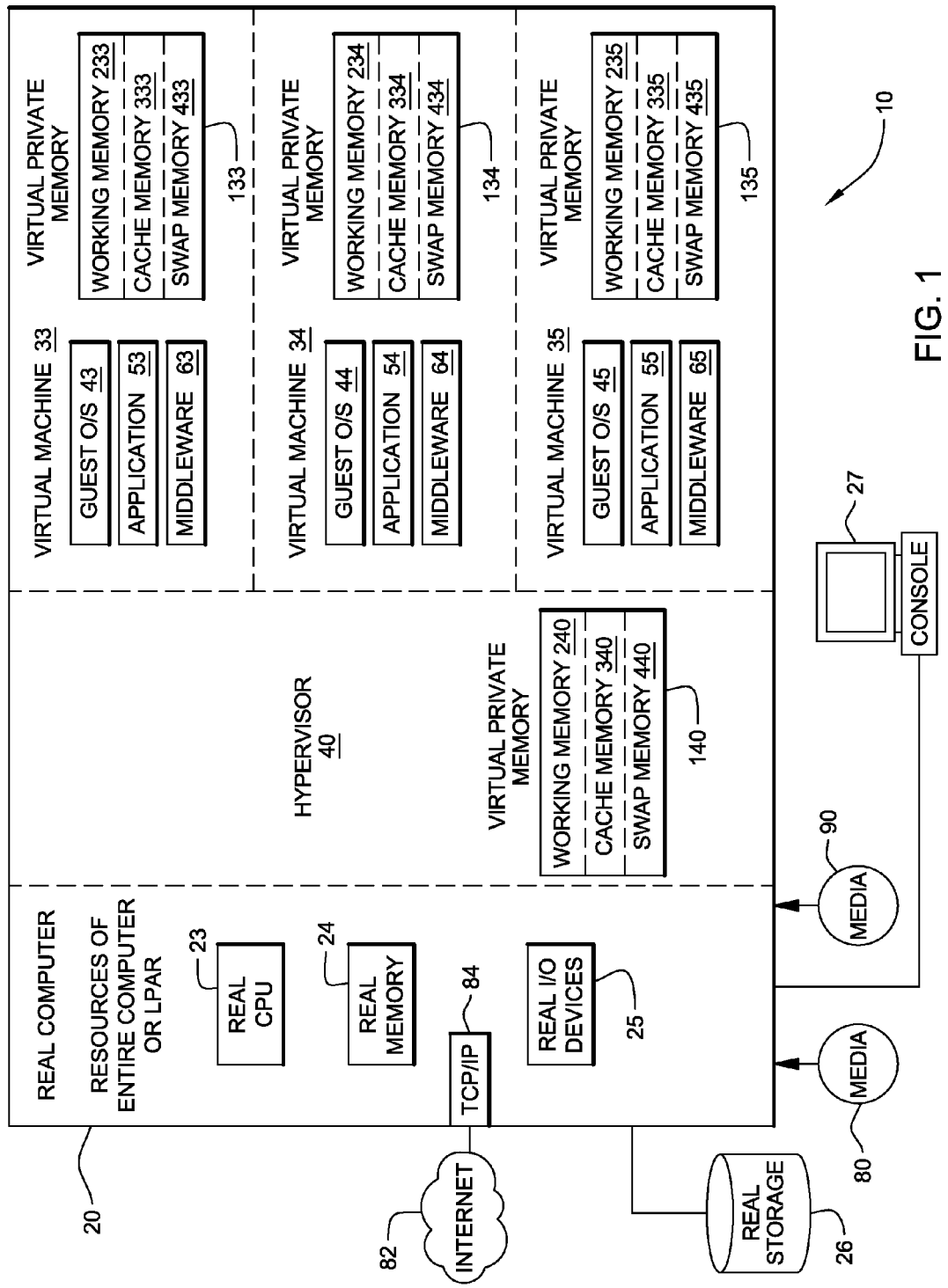
FIG. 1 is a block diagram of a real computer including a guest operating system and hypervisor program according to the present invention.

The present invention will now be described in detail with reference to the figures. FIG. 1 illustrates a computer system generally designated 10 in accordance with one embodiment of the present invention. Computer system 10 comprises a real/physical computer 20 with a real CPU 23, RAM 24, I/O device 25, external storage 26, and external operator console 27. In one embodiment of the present invention, computer 20 is not divided into logical partitions ("LPARs"). However, in another embodiment of the present invention, a known logical partitioning program (not shown) divides computer 20 into LPARs, and one such LPAR is shown in FIG. 1. An LPAR is a real or logical partitioning of the real computer resources of computer 20. For example, if computer 20 includes eight processors, the logical partitioning program can allocate two real processors to each of four LPARs, or the logical partitioning program can time share all eight processors between the four LPARs. The logical partitioning program also divides the total memory of computer 20 between the different LPARs, and translates logical addresses used by each LPAR to the real memory addresses where the actual data is stored. By way of example, real computer 20 can be an IBM zSeries server although the present invention can be implemented in other server computers or personal computers as well. In the embodiment with computer 20 divided into LPARs, the logical partitioning program can be a known IBM Processor Resource/Resource Manager ("PR/SM") (™) program.

A hypervisor program 40 executes in computer 20, and divides the real resources of computer 20 into virtual machines 33, 34 and 35 (as well as other virtual machines not shown). In other words, hypervisor program 40 logically divides and virtualizes the computer resources including CPU 23, memory 24, I/O device 25 and disk storage 26 of computer 20 to form the resource platform for each of the virtual machines 33, 34 and 35. (If computer 20 is divided into different LPARs, then a separate hypervisor program similar to hypervisor program 40 executes in each LPAR, and logically divides each LPAR into virtual machines.) For example, hypervisor 40 allocates to each virtual machine 33, 34 and 35 a time share of the real processor(s) 23 and a range of virtual private memory mapped to real RAM 24. For example, hypervisor 40 allocates virtual private memory 133 to virtual machine 33, virtual private memory 134 to virtual machine 34 and virtual private memory 135 to virtual machine 35. When a virtual machine 33, 34 or 35 addresses its virtual private memory, the hypervisor 40 translates the virtual memory address into a real address of real memory 24. Hypervisor 40 can request the guest operating systems in respective virtual machines to increase or decrease their respective swap memories to satisfy a need by the hypervisor 40 for more or less virtual private memory, respectively, for itself or another virtual machine.

Guest operating systems 43, 44 and 45 execute in respective virtual machines 33, 34 and 35, and applications 53, 54 and 55 and middleware 63, 64 and 65 execute on respective guest operating systems 43, 44 and 45. However, there may be multiple applications executing on each guest operating system. By way of example, the guest operating systems can be the Linux (™ of Linus Torvalds) operating system or IBM CMS operating system modified according to the present invention to comply with requests from the hypervisor to increase or decrease virtual private memory and concurrently increase or decrease swap memory to compensate for concurrent increased or decreased working memory and cache memory such that total virtual private memory allocation in each virtual machine remains approximately the same. Other guest operating systems are also usable such as Microsoft Windows (™) operating system, Unix (™) operating system, Sun Microsystems Solaris (™) operating system or Hewlett Packard HP UX operating system, modified according to the present invention. By way of example, applications 53, 54 and 55 can be IBM DB2 data base management application, and middleware 63, 64 and 65 can be IBM Websphere program. The nature of applications 53, 54 and 55 and middleware 63, 64 and 65 form no part of the present invention except that they utilize virtual private memory. The guest operating systems 43, 44 and 45 within respective virtual machines 33, 34 and 35 divide their respective allocations of virtual private memory 133, 134 and 135 into respective (virtual virtual) working memory 233, 234 and 235, cache memory 333, 334 and 335 and swap memory 433, 434 and 445. The guest operating system, middleware and application(s) and their data for each virtual machine in computer 10 are stored in the respective working memory allocated to the virtual machine. The cache memory contains data accessed from (disk) storage or swap memory and associated metadata. The metadata comprises a directory and sub directory path to the data file, identities of records within the file currently being written or read, size of the file, size of records in the file, type (ASCII, EBCDIC or BINARY) of data in the file, where the file is stored on disk, etc. Most guest operating systems include some algorithm for determining which pages of data will remain in the cache memory when the cache is full and which pages of data should remain in the working memory when the working memory is full. For example, most guest operating systems use a least recently used algorithm to outpage the least recently used data from the cache memory to external storage or swap memory when there is insufficient room in the cache memory for new data needed by the virtual machine, and use a similar algorithm to outpage the least recently used data from the working memory to external storage or swap memory when there is insufficient room in the working memory for new data needed by the virtual machine. Each swap memory is used to receive and store data paged out from cache memory and working memory as an alternative to paging out data to disk storage. Data resident in swap memory is also paged in as needed. Each guest operating system chooses whether to page out data to swap memory or to disk storage based on user-configuration of the virtual machine. In the present invention, the guest operating systems are configured to page out data to swap memory, and page in data from swap memory. In a typical scenario, when there is insufficient cache memory or working memory to store data (information or programs) needed by the virtual machine, the guest operating system in the virtual machine identifies the least recently used memory data (as four Kilobyte pages) in cache memory or working memory of the virtual machine. Then, the guest operating system copies the least recently used memory pages to swap memory of the virtual machine. This frees-up cache memory and working memory of the virtual machine to enable the respective guest operating system to inpage other, more needed pages of data from swap memory to cache memory or working memory.

The hypervisor 40 also allocates to itself a virtual private memory 140 and divides its own virtual private memory 140 into working memory 240, cache memory 340, and swap memory 440. The hypervisor 40 also allocates a shared memory 150 (accessible and shared by all of virtual machines 33, 34 and 35).

The Linux operating system (Microsoft Windows operating system and other operating systems), as a guest operating system, may virtualize the virtual private memory that the hypervisor 40 allocates to it. In its own virtualization process, the Linux operating system over-commits the virtual private memory that the hypervisor 40 has allocated to it. For example, assume that the hypervisor allocated three Gigabytes of virtual private memory to a virtual machine having the Linux (or other) guest operating system. In response, the Linux guest operating system may itself virtually allocate six Gigabytes to processes executing on the Linux operating system. This is realistic because the processes typically use, on average, much less memory than allocated to them.

The Linux operating system (and Microsoft Windows operating system) tends to keep not recently used data in its working memory and cache memory because there is some chance that it will be needed in the future and this will reduce subsequent outpaging and inpaging. Because of this, the Linux operating system (and Microsoft Windows operating system) typically does not use swap memory or substantially under utilizes its swap memory during normal operation, even when configured to use swap memory for page outs (and page ins).

The following is an example of memory allocations by hypervisor 40 and guest operating systems 43, 44 and 45 during a moment in time during normal operation, when configured to use swap memory:

| Component | Virtual Private Memory Allocated by Hypervisor | Virtual Virtual Private Memory Allocated by Guest Operating System Based on Virtual Private Memory Allocated by Hypervisor |
|---|---|---|
| Real Memory (15 Gigabytes) Hypervisor 40 | | |
| Working Memory 240: | 4 Gigabytes | |
| Cache Memory 340: | 1 Gigabyte | |
| Swap Memory 440: | 0.5 Gigabyte | |
| Virtual Machine 33 | | |
| Working Memory 233: | 5 Gigabytes | 10 Gigabytes |
| Cache Memory 333: | 2 Gigabytes | 4 Gigabytes |
| Swap Memory 433: | 1 Gigabyte | 2 Gigabytes |

| Component | Virtual Private Memory Allocated by Hypervisor | Virtual Virtual Private Memory Allocated by Guest Operating System Based on Virtual Private Memory Allocated by Hypervisor |
|---|---|---|
| Virtual Machine 34 | | |
| Working Memory 234: | 5 Gigabytes | 10 Gigabytes |
| Cache Memory 334: | 2 Gigabytes | 4 Gigabytes |
| Swap Memory 434: | 1 Gigabytes | 2 Gigabytes |
| Virtual Machine 35 | | |
| Working Memory 235: | 2.5 Gigabytes | 5 Gigabytes |
| Cache Memory 335: | 1 Gigabyte | 2 Gigabytes |
| Swap Memory 435: | 0.5 Gigabytes | 1 Gigabyte |

Note that in this example, the total real memory in computer 10 (15 Gigabytes) is substantially less that than all the virtual memory allocations by hypervisor 40 combined (41.5 Gigabytes). In this example, the total virtual virtual memory allocation by all the guest operating systems to their processes is even greater (83 Gigabytes). This is realistic because hypervisor 40 and virtual machines 33-35 typically use much less virtual memory than their respective virtual memory allocations. Assume in this example that the actual memory consumption by all processes in computer 10 normally varies between 8 Gigabytes and 13 Gigabytes.

In this example, assume that at some later time, hypervisor 40 needs additional virtual private memory (for example, approximately an additional 5 Gigabytes) for itself. Consequently, hypervisor 40 makes requests to guest operating systems 43, 44 and 45 in respective virtual machines 33, 34 and 35 to increase specific amounts of their respective swap memory by converting working memory and/or cache memory to additional swap memory. For example, to free-up approximately 5 Gigabytes of actual memory for itself, hypervisor 40 will request that guest operating system 43 convert an additional 2 Gigabytes of virtual private memory (i.e. working memory and/or cache memory) to swap memory, hypervisor 40 will request that guest operating system 44 convert an additional 2 Gigabytes of virtual private memory (i.e. working memory and/or cache memory) to swap memory, and hypervisor 40 will request that guest operating system 43 convert an additional 1 Gigabyte of virtual private memory (i.e. working memory and/or cache memory) to swap memory. This is a total increase of swap memory of 5 Gigabytes. In response to the requests, each guest operating system converts the specified amount of its working memory and/or cache memory to swap memory. (If any guest operating system does not have sufficient available working memory or cache memory to comply with the request, then the guest operating system will comply only to the degree that it can.) Each guest operating system uses its own algorithm to determine how much of the current working memory to convert to swap memory and how much of the current cache memory to convert to swap memory to meet the hypervisor's request. For example, each guest operating system can proportionally convert existing working memory and existing cache memory, based on their current allocations, to swap memory to meet the request of the hypervisor. In the foregoing example, the following are the memory allocations after the hypervisor requests each virtual memory to convert specified amounts of its virtual private memory (i.e. working memory and/or cache memory) to swap memory, and each virtual machine complies with a proportional decrease in its working memory and cache memory.

| Component | Virtual Private Memory Allocated by Hypervisor | Virtual Virtual Private Memory Allocated by Guest Operating System Based on Virtual Private Memory Allocated by Hypervisor |
|---|---|---|
| Real Memory (15 Gigabytes) | | |
| Hypervisor 40 | | |
| Working Memory 240: | 7.60 Gigabytes | |
| Cache Memory 340: | 1.90 Gigabyte | |
| Swap Memory 440: | 0.95 Gigabyte | |
| Virtual Machine 33 | | |
| Working Memory 233: | 3.57 Gigabytes | 7.14 Gigabytes |
| Cache Memory 333: | 1.43 Gigabytes | 2.86 Gigabytes |
| Swap Memory 433: | 3 Gigabyte | 6 Gigabytes |
| Working Memory 234: | 3.57 Gigabytes | 7.14 Gigabytes |
| Cache Memory 334: | 1.43 Gigabytes | 2.86 Gigabytes |
| Swap Memory 434: | 3 Gigabytes | 6 Gigabytes |
| Virtual Machine 35 | | |
| Working Memory 235: | 1.78 Gigabytes | 3.56 Gigabytes |
| Cache Memory 335: | .72 Gigabyte | 1.44 Gigabytes |
| Swap Memory 435: | 1.5 Gigabytes | 3 Gigabyte |

In this example, hypervisor 40 has increased its total virtual private memory allocation by 5 Gigabytes, virtual machine 33 has proportionally converted two Gigabytes of combined working memory and cache memory to swap memory, virtual machine 34 has proportionally converted two Gigabytes of combined working memory and cache memory to swap memory, and virtual machine 35 has proportionally converted one Gigabyte of combined working memory and cache memory to swap memory. In this example, the total virtual private memory allocation to each virtual machine 33, 34 and 34 does not change, even though the total memory allocation to the hypervisor 40 has increased by 5 Gigabytes. This is realizable because, on average, each virtual machine will substantially underutilized its respective swap memory, but the swap memory will be available to the respective virtual machine when needed to facilitate out paging. (In another embodiment of the present invention, each of the virtual machines will increase its amount of swap memory but decrease by a greater amount its amount of working memory and/or cache memory)

With the conversion of working memory and cache memory to swap memory in each virtual machine, there will be lesser total actual utilization of virtual private memory by the virtual machines, because the swap memory will be used only when necessary, while generally the cache memory and working memory are substantially utilized regardless of necessity. This provides extra available memory for the hypervisor. The extra swap memory in each virtual machine tends to compensate for the reduced working memory and cache memory in each virtual machine because there will be more page outs and page ins with the reduced working memory and cache memory, and the additional swap memory facilitates the page outs and page ins, when needed.

In this example, assume that at some later time, hypervisor 40 needs less virtual private memory (for example, approximately 5 Gigabytes less) for itself. Consequently, hypervisor 40 makes requests to guest operating systems 43, 44 and 45 in respective virtual machines 33, 34 and 35 to convert specific amounts of their respective swap memory to working memory and/or cache memory, thereby decreasing the amount of swap memory in each virtual machine. In response, each guest operating system converts the specified amount of swap memory to working memory and/or cache memory. Each guest operating system uses its own algorithm to determine how much of the specified amount of swap memory to convert to working memory, and how much of the specified amount of swap memory to convert to cache memory. In the foregoing example, each guest operating system can convert the specified amount of swap memory proportionally to working memory and cache memory based on their current allocations. For example, to relinquish approximately 5 Gigabytes of actual memory for its own use, hypervisor 40 will request that guest operating system 43 convert 2 Gigabytes of its swap memory to working memory and/or cache memory, hypervisor 40 will request that guest operating system 44 convert 2 Gigabytes of swap memory to working memory and/or cache memory, and hypervisor 40 will request that guest operating system 43 convert 1 Gigabyte of swap memory to working memory and/or cache memory. This is a total decrease of swap memory of 5 Gigabytes. In response to the requests, each guest operating system converts the specified amount of its reduced swap memory to working memory and/or cache memory. Each guest operating system uses its own algorithm to determine how much to increase its current working memory and current cache memory to meet the hypervisor's request. For example, each guest operating system can convert the excess swap memory proportionally to working memory and cache memory based on the current allocations of working memory and cache memory to meet the request of the hypervisor. Alternately, each guest operating system can convert the excess swap memory to working memory and cache memory based on the current utilizations of working memory and cache memory. Alternately, each guest operating system can convert all the excess swap memory to cache memory. In the foregoing example, the following are the memory allocations after the hypervisor requests each virtual memory to convert a specified amount of its swap memory to working memory and/or cache memory, and each virtual machine complies with a proportional increase in working memory and cache memory.

| Component | Virtual Private Memory Allocated by Hypervisor | Virtual Virtual Private Memory Allocated by Guest Operating System Based on Virtual Private Memory Allocated by Hypervisor |
| --- | --- | --- |
| Real Memory (15 Gigabytes) Hypervisor 40 | | |
| Working Memory 240: | 4 Gigabytes | |
| Cache Memory 340: | 1 Gigabyte | |
| Swap Memory 440: | 0.5 Gigabyte | |
| Virtual Machine 33 | | |
| Working Memory 233: | 5 Gigabytes | 10 Gigabytes |
| Cache Memory 333: | 2 Gigabytes | 4 Gigabytes |
| Swap Memory 433: | 1 Gigabyte | 2 Gigabytes |
| Virtual Machine 34 | | |
| Working Memory 234: | 5 Gigabytes | 10 Gigabytes |
| Cache Memory 334: | 2 Gigabytes | 4 Gigabytes |
| Swap Memory 434: | 1 Gigabytes | 2 Gigabytes |
| Virtual Machine 35 | | |
| Working Memory 235: | 2.5 Gigabytes | 5 Gigabytes |
| Cache Memory 335: | 1 Gigabyte | 2 Gigabytes |
| Swap Memory 435: | 0.5 Gigabytes | 1 Gigabyte |

In this example, hypervisor 40 has decreased its total virtual private memory allocation by 5 Gigabytes, virtual machine 33 has converted two Gigabytes of swap memory to working memory and swap memory, virtual machine 34 has converted two Gigabytes of swap memory to working memory and cache memory, and virtual machine 35 has converted one Gigabyte of swap memory to working memory and cache memory. In this example, the total virtual private memory allocation to each virtual machine does not change, even though the total memory allocation to the hypervisor 40 has decreased by 5 Gigabytes. This is realistic because on average, each virtual machine more fully utilizes its working memory and cache memory than swap memory.

Figure 2:
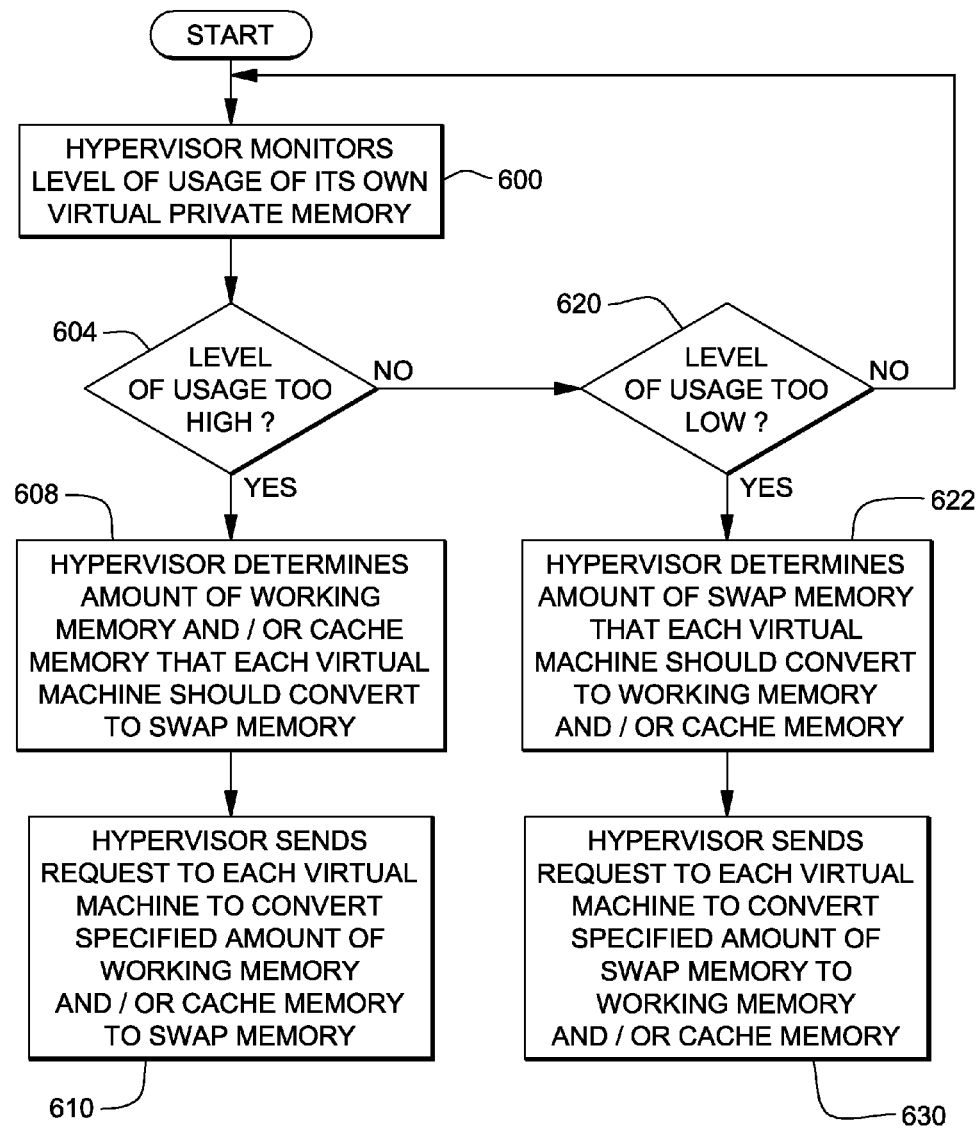
FIG. 2 is a flow chart of function and operation of the hypervisor program of FIG. 1.

FIG. 2 illustrates the operation and function of hypervisor 40 in more detail. In step 600, the hypervisor 40 monitors its total current utilization of its own virtual private memory 150. Hypervisor 40 monitors it current utilization of virtual private memory by monitoring the amount of outpaging and inpaging from its own virtual private memory. If the hypervisor's virtual private memory is fully or nearly fully utilized, there will be a large amount of outpaging and inpaging because there is insufficient available working memory and cache memory, and vice versa. For example, in case of insufficient working memory and cache memory, the number of outpages and inpages during a predetermined interval will be greater than a predetermined upper threshold. Next, hypervisor 40 determines if its total current utilization of its own virtual private memory 150 is greater than a threshold, for example, whether there is a greater amount of outpaging and inpaging than the predetermined upper threshold (decision 604). If the total current utilization of the virtual private memory 150 of hypervisor 40 exceeds the predetermined threshold (decision 604, yes branch), then hypervisor 40 determines the total amount of additional virtual private memory that hypervisor 40 needs (step 608). In step 608, hypervisor 40 determines the total amount of virtual private memory that it needs based on the number of page-outs and page-ins. The more page-outs and page-ins experienced by the hypervisor 40, the more virtual private memory needed by the hypervisor 40. Next, hypervisor 40 determines how much swap memory each virtual machine should add to total the additional amount of virtual private memory needed by hypervisor 40. For example, the hypervisor 40 can ask each virtual machine to convert to swap memory an equal amount of virtual private memory to total the amount needed by the hypervisor 40. So, if the hypervisor needs 5 Gigabytes of virtual private memory and there are 5 virtual machines, then the hypervisor 40 can request each virtual machine to convert 1 Gigabyte of its own working memory and/or cache memory to swap memory. As another example, the virtual machines are prioritized, and hypervisor 40 requests the lower priority virtual machines to convert to swap memory a greater amount of working memory and/or cache memory than hypervisor 40 requests the higher priority virtual machines to convert to swap memory. Next, hypervisor 40 sends a request to each of virtual machines 33, 34 and 35 to convert a respective, specified amount of working memory and/or cache memory to swap memory (step 630). In the foregoing example, hypervisor 40 requests virtual machine 33 to convert 2 Gigabytes of working memory and/or cache memory to swap memory, hypervisor 40 requests virtual machine 34 to convert 2 Gigabytes of working memory and/or cache memory to swap memory, and hypervisor 40 requests virtual machine 35 to convert 1 Gigabyte of working memory and/or cache memory to swap memory.

Refer again to decision 604, no branch, where the hypervisor 40 does not need additional virtual private memory. In such a case, hypervisor 40 determines, based on its current number of page outs and page ins, whether it can relinquish some of its current allocation of virtual private memory. If the number of page-outs and page-ins is very low, then hypervisor 40 can relinquish more of its current allocation of virtual private memory than if the current number of page-outs and page-ins is higher (decision 620). If hypervisor 40 decides not to relinquish some of its current allocation of virtual private memory, then hypervisor 40 loops back to step 600 after a predetermined interval to again monitor its total current utilization of virtual private memory. However, if hypervisor 40 decides to relinquish some of its current allocation of virtual private memory (decision 620, yes branch), then hypervisor 40 determines the total amount of additional virtual private memory that hypervisor 40 will relinquish (step 622). In step 622, hypervisor 40 determines the total amount of virtual private memory that it does not need based on the current number of page outs and page ins as described above. Next, hypervisor 40 determines how much swap memory each virtual machine should convert to working memory and/or cache memory to total the amount of virtual private memory to be relinquished by hypervisor 40. For example, hypervisor 40 can relinquish to each virtual machine an equal share of virtual private memory not needed by the hypervisor. Alternately, hypervisor 40 can relinquish to higher priority virtual machines a greater share of unneeded private virtual memory than relinquished to lower priority virtual machines. Next, hypervisor 40 sends a request to each of virtual machines 33, 34 and 35 to convert a respective, specified amount of swap memory to working memory and/or cache memory (step 610). In the foregoing example, hypervisor 40 requests virtual machine 33 to convert 2 Gigabytes of swap memory to working memory and/or cache memory to swap memory, hypervisor 40 requests virtual machine 34 to convert 2 Gigabytes of swap memory to working memory and/or cache memory, and hypervisor 40 requests virtual machine 35 to convert 1 Gigabyte of swap memory to working memory and/or cache memory.

Figure 3:
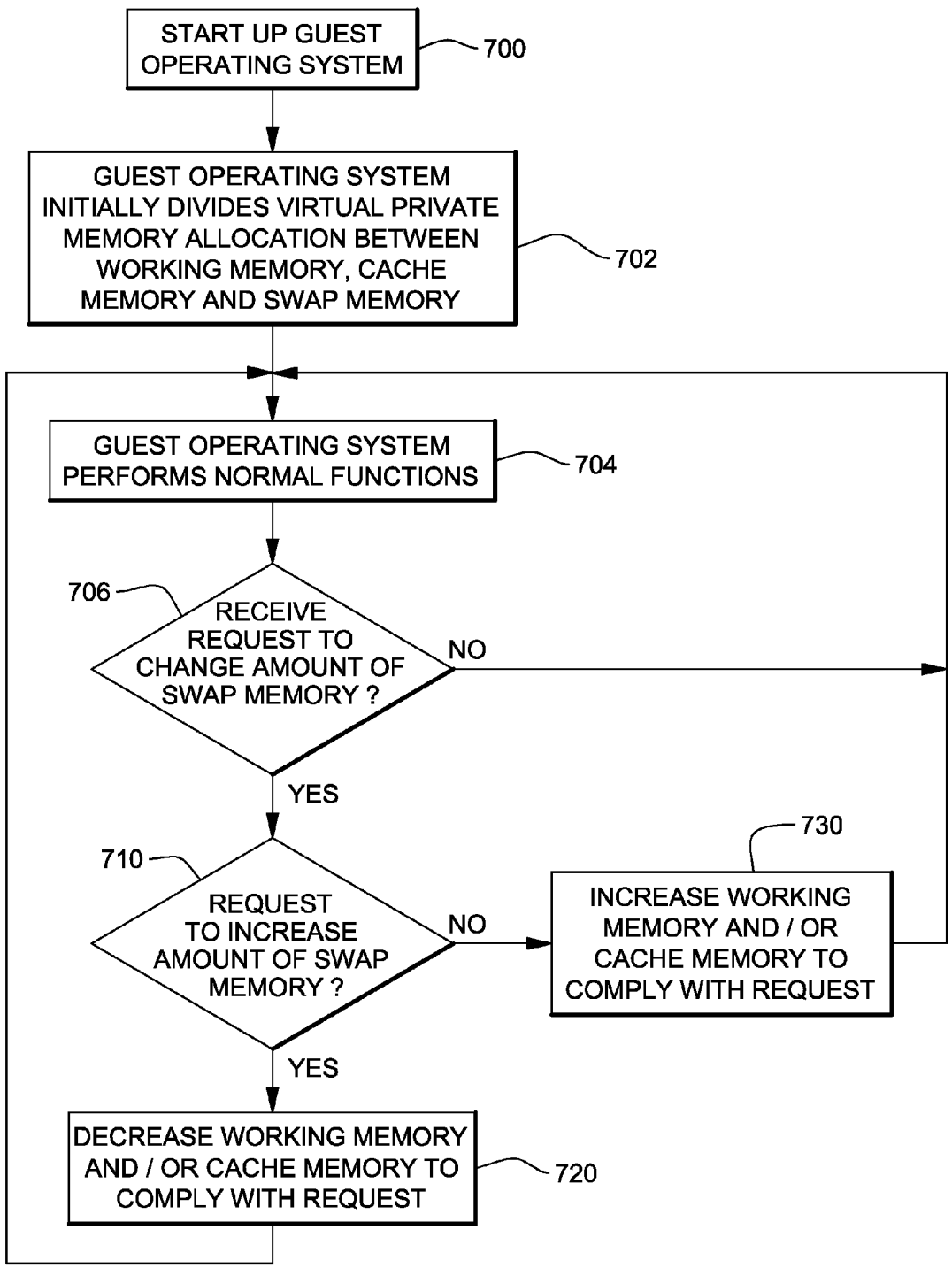
FIG. 3 is a flow chart of function and operation of the guest operating system of FIG. 1.

FIG. 3 illustrates function and operation of a guest operating system in one of the virtual machines. (The other guest operating systems in the other virtual machines function and operate similarly.) In step 700, the guest operating system is started. Next, the guest operating system reads a configuration file that indicates an initial virtual private memory allocation from hypervisor 40 and uses its internal algorithm to divide the initial virtual private memory allocation into working memory, cache memory and swap memory and virtualize the initial virtual private memory allocation from the hypervisor (step 702). For example, the internal algorithm can divide the initial virtual private memory allocation into working memory, cache memory and swap memory based on an initial configuration defined by a systems administrator. Next, the guest operating system performs its known operating system functions, for example to execute its applications and middleware (step 704). Next, the guest operating system receives a request from the hypervisor 40 to change the guest system operating system's amount of swap memory (decision 706), and determines if the request is to increase or decrease the amount of swap memory and the requested amount of increase or decrease of swap memory (decision 710). If the request from the hypervisor is to increase swap memory (decision 710, yes branch), then the guest operating system decreases its total virtual private memory allocation of working memory and/or cache memory by the specified amount and increases its virtual private memory allocation of swap memory by the specified amount (step 720). In step 720, the guest operating system determines how much to decrease its working memory based on its own algorithm or user-defined configuration. Also, in step 720, the guest operating system determines how much to decrease its cache memory based on its own algorithm or user-defined configuration. For example, the guest operating system can decrease its own cache memory by the full amount that it increases its own swap memory. As another example, the guest operating system can decrease its working memory and cache memory in respective amounts corresponding to the respective amounts of under-utilization of the working memory an cache memory. So, if a large amount of working memory is under utilized whereas a lesser amount of the cache memory is under utilized, then the guest operating system will convert more of the working memory and less of the cache memory (but some of each) to swap memory. Referring again to decision 710, if the request from the hypervisor is to decrease swap memory (decision 710, no branch), then the guest operating system increases its working memory and/or cache memory by the specified amount and decreases its swap memory by the specified amount (step 730). In step 730, the guest operating system determines how much to increase its working memory based on its own algorithm or user-defined configuration. Also, in step 730, the guest operating system determines how much to increase its cache memory based on its own algorithm or user-defined configuration. For example, the guest operating system can increase its own cache memory by the full amount that it decreases its own swap memory. As another example, the guest operating system can increase its working memory and cache memory in respective amounts corresponding to the respective amounts of utilization of the working memory an cache memory. So, if a large amount of working memory is utilized whereas a lesser amount of the cache memory is utilized, then the guest operating system will convert more of the swap memory to working memory and less to cache memory (but some to each).

The guest operating systems 43, 44 and 45 can be loaded into computer 20 from a computer readable media 80 such as magnetic tape or disk, optical media, DVD, semiconductor memory, memory stick, etc. or downloaded from the Internet 82 via a TCP/IP adapter card 84.

The hypervisor program 40 can be loaded into computer 20 from a computer readable media 90 such as magnetic tape or disk, optical media, DVD, semiconductor memory, memory stick, etc. or downloaded from the Internet 82 via a TCP/IP adapter card 84.

Based on the foregoing, a computer system, method and program for managing memory of a virtual machine have been disclosed. However, numerous modifications and substitutions can be made without deviating from the scope of the present invention. For example, hypervisor 40, when faced with a need for additional or less virtual private memory for itself, can change the total amount of virtual private memory allocation to one or more virtual machines in addition to changing their amounts of swap memory. Therefore, the present invention has been disclosed by way of illustration and not limitation and reference should be made to the following claims to determine the scope of the present invention.

What is claimed:

1. A method for managing virtual memory allocated by a virtual machine control program to a plurality of virtual machines, each of said virtual machines having an allocation of virtual private memory divided into working memory, cache memory and swap memory, said method comprising the steps of:

the virtual machine control program determining that it needs additional virtual memory allocation, and in response, the virtual machine control program making respective requests to said virtual machines to convert some of their respective working memory and/or cache memory to swap memory; and said virtual machines complying with said respective requests to convert some of their respective working memory and/or cache memory to swap memory.

2. A method as set forth in claim 1 wherein each of said requests specifies an amount of working memory and/or cache memory to convert to swap memory.

3. A method as set forth in claim 1 wherein said plurality of virtual machines include a respective plurality of guest operating systems that are programmed to utilize working memory and/or cache memory allocated to their respective virtual machine more fully than swap memory allocated to their respective virtual machine.

4. A method as set forth in claim 1 wherein each of said virtual machines complies with said requests to convert some of their respective working memory and/or cache memory to swap memory by converting cache memory to swap memory.

5. A virtual machine control program product for allocating virtual memory to a virtual machine control program and a plurality of virtual machines, each of said virtual machines having an allocation of virtual private memory divided into working memory, cache memory and swap memory, said virtual machine control program product comprising:
   a computer readable media;
   first program instructions to determine that said virtual machine control program needs additional virtual memory allocation, and in response, make requests to each of said virtual machines to convert some of their respective working memory and/or cache memory to swap memory; and wherein
   said first program instructions are stored on said computer readable media in functional form.

6. A virtual machine control program product as set forth in claim 5 wherein each of said requests specifies an amount of working memory and/or cache memory to convert to swap memory.

7. A virtual machine control program product as set forth in claim 5 wherein said plurality of virtual machines include a respective plurality of guest operating systems that are programmed to utilize working memory and/or cache memory allocated to their respective virtual machine more fully than swap memory allocated to their respective virtual machine.

8. A computer system for allocating virtual memory to a virtual machine control program and a plurality of virtual machines, each of said virtual machines having an allocation of virtual private memory divided into working memory, cache memory and swap memory, said computer system comprising:
   means for determining that said virtual machine control program needs additional virtual memory allocation, and in response, making respective requests to said virtual machines to convert some of their respective working memory and/or cache memory to swap memory; and
   said virtual machines including means for complying with said respective requests to convert some of their respective working memory and/or cache memory to swap memory.

9. A computer system as set forth in claim 8 wherein each of said requests specifies an amount of working memory and/or cache memory to convert to swap memory.

10. A computer system as set forth in claim 8 wherein said plurality of virtual machines include a respective plurality of guest operating systems that are programmed to utilize working memory and/or cache memory allocated to their respective virtual machine more fully than swap memory allocated to their respective virtual machine.

11. A method for managing virtual memory allocated by a virtual machine control program to a plurality of virtual machines, each of said virtual machines having an allocation of virtual private memory divided into working memory, cache memory and swap memory, said method comprising the steps of:
   the virtual machine control program determining that it needs less virtual memory allocation than currently allocated to said virtual machine control program, and in response, the virtual machine control program making respective requests to said virtual machines to convert some of their respective swap memory to working memory and/or cache memory.

12. A method as set forth in claim 11 wherein each of said requests specifies an amount of swap memory to convert to working memory and/or cache memory.

13. A method as set forth in claim 11 wherein said plurality of virtual machines include a respective plurality of guest operating systems that are programmed to utilize working memory and/or cache memory allocated to their respective virtual machine more fully than swap memory allocated to the respective virtual machine.

14. A method as set forth in claim 11 further comprising the steps of:
   said virtual machines complying with said respective requests to convert some of their respective swap memory to working memory and/or cache memory.

* * * * *